United States Patent Office 3,546,150
Patented Dec. 8, 1970

3,546,150
POLYMER ADDITIVES COATED WITH WAX AND HYDROXYL-CONTAINING FATTY MATERIALS, PROCESSES THEREFOR, AND POLYMER COMPOSITIONS CONTAINING SAME
Edward L. White, Freehold, N.J., and Adrian R. Pitrot, Uniondale, N.Y., assignors to National Lead Company, New York, N.Y., a corporation of New Jersey
No Drawing. Filed Nov. 4, 1966, Ser. No. 591,964
Int. Cl. C08j 1/48; C08c 11/28
U.S. Cl. 260—28.5
23 Claims

ABSTRACT OF THE DISCLOSURE

Coated particulate additives for polymers (for instance, vinyl chloride polymers) including a solid substrate (for instance, dehydrated tribasic lead sulfate, titanium dioxide, or antimony oxide, and the like) having a coating of a wax (for instance, paraffin wax) and 5% or more of a hydroxyl containing fatty material (for instance, a fatty alcohol such as stearyl or lauryl alcohol), the process for applying said coatings, and the polymer compositions containing the coated particulate additives.

---

This invention is generally concerned with novel coated additives for increasing effectiveness of the additives when incorporated into plastics, elastomers, and resins, and more particularly, it is concerned with novel coated compositions especially adapted for use as stabilizers for plastics, elastomers and resins.

It is an object of this invention to provide novel coated compositions for use as additives in plastics and resins.

Another object is to define coating compositions having viscosity properties such that when coated on solids, they are improved as additives for resins and plastics.

Another object is to provide coatings comprising waxes and fatty alcohols which may be employed to coat solids for additives in plastics and resins.

A further object is to improve the wettability and dispersability of solid additives for plastics and resins.

Another object is to provide coatings of fatty alcohols and paraffin wax for tribasic lead sulfate.

An additional object is to provide coatings which reduce the abrasive effects of solid pigments, stabilizers and other additives for polymers upon processing equipment.

Other and further objects will become apparent from reading of the detailed description of the invention presented hereinbelow.

The necessity to use some kind of coating on additives which are incorporated into polymers exists for all kinds of additives. Many types of additives are used in both elastomeric and resin compositions. In all of the compositions, dispersability is a major problem, since the additives must be distributed uniformly throughout the elastomer or resin in order to have their maximum effect. In great part, the difficulty with dispersion results from the lack of wettability of the substrate additive particles. This problem becomes especially acute where no liquids are present in the polymeric compositions. Other effects such as electro static properties of the additives and the like, may also be present.

It has now been discovered that a mixture of at least one hydroxyl containing compound, more especially a fatty alcohol having at least eight carbon atoms and a natural or synthetic wax yield a superior coating for solid additives used in resins, elastomers and plastics. Many additives which are normally used in elastomers and resins, including, antioxidants, slip agents, antiblock agents, fillers, pigments, gas generating agents, stabilizers and the like are much improved by the addition of a coating thereto before incorporation into the polymer matrix. It has been further found that this coating is preferably composed of at least two components, i.e. a fatty alcohol and a wax. Among the preferred combinations is stearyl alcohol and paraffin wax. It is preferred to premix the components before admixing the substrate, although this is not critical.

It has been further found that from 5 to about 50 percent by weight of the fatty alcohol in the total gives a most effective coating for such solid additives as stabilizers and the like. Tests have been conducted on a number of different kinds of additives including tribasic lead sulfate, an additive for polymers and resins and particularly useful as a stabilizer for polyvinyl chloride compositions. Approximately 10 to 25% of the coating composition has been found to be most effective on various additives and especially for tribasic lead sulfate. It is possible, however, to employ amounts of coating of from 5 to 50 weight percent on solid additive substrates to improve their effectiveness and dispersability in elastomers and resins. The advantages of these coatings have been found to be outstanding for use in coating tribasic lead sulfate in rigid polyvinyl chloride compositions.

It has been observed that the desirable combination of properties in the coating composition is formation of a very fluid melt without imparting excessive lubricity to the polymer composition. These properties result in a coated product which is very fluid in the melt and also gives maximum wetting of the additive substrate. Studies on viscosities of the various coated compositions have been found helpful both in ascertaining ease of application and effectiveness of the resulting products when incorporated in the polymer matrix. For example, for tribasic lead sulfate, from 5 to 30 percent of stearyl alcohol in paraffin base coating was found to give good viscosity values over the appropriate range of temperatures.

The selected hydroxyl containing component of the coating composition may be any material having a fatty or hydrocarbon end as the non-polar portion and a relatively polar group. More specifically, the relatively long chain aliphatic alcohols having at least eight and up to twenty-eight carbon atoms are preferred. Typical of useful hydroxyl containing compounds, are normal octyl alcohol, 2-ethyl hexanol, isooctyl, n-lauryl alcohol, stearyl alcohol, hydroxy stearyl alcohol, montanyl alcohol, oleyl alcohol, ricinoleic acid, methyl 12-hydroxy-stearate, and the like.

The material chosen for use may be one compound or it may be a mixture of two or more compounds. It is necessary that the selected material not cause color formation, staining, or degradation of the particular polymer composition. It should also be relatively easy to incorporate and should not be reactive with the wax, or with the material into which it is to be incorporated.

The wax component of the coating composition may be either of the natural or synthetic type. Typical examples which are preferred are hydrocarbon waxes such as paraffin wax, ester waxes such as spermaceti, mineral waxes such as montan wax, amide waxes such as ethylene distearamide and ethylene diricinoleamide, halogenated hydrocarbon waxes such as chlorinated paraffin waxes, and chlorinated naphthalenes, and ketone waxes such as stearone. The melting point of the wax should be at least high enough so that the coating remains solid and firm at room and storage temperatures. It is preferred that the wax soften or melt at 50–150° C. for purposes of convenience of incorporation. The fluid which is formed should have a relatively low viscosity at low temperatures, which results in a very fluid melt. The waxes and wax-like materials can be employed singly or in mixtures of various proportions.

It has also been found possible to use certain waxes containing within the molecule the required hydroxyl group. For instance, castor wax or ethylene diricinoleamide can function alone as the coating material; however, their performance is enhanced when another hydroxyl containing component is added thereto.

No completely satisfactory reason has been advanced for the outstanding results obtained with the wax coatings when used on solid additives for incorporation into polymers. However, numerous and unexpected advantages are obtained. One important advantage in processing is that in the mill or blender, the frictional or applied heat causes the wax coating to melt and thereby promotes dispersion of the additive throughout the resin. As a result, the efficiency of the additive for its function in the resin is substantially improved.

Since the additive itself is difficultly wetted by the resin, the coating has the additional advantage of wetting the surface of the additive particles, thereby making them more easily dispersable in the resin composition. One result is that the so-called plating out of the additive substrate on to metal processing surfaces is substantially reduced by the presence of the coating on the additive substrate.

An additional and frequently important advantage of the coating is to retard absorption of water or other undesirable vapors or to retard reabsorption of water into previously dehydrated additives.

Also, application of the coatings of the invention reduces the abrasiveness of the solid substrates, which causes undue wear and erosion of metal surfaces in contact with the final resin composition including the working parts of the processing equipment. Metal contamination caused by abrasion is a serious source of discoloration and degradation of the resins.

The use of the wax coatings are of advantage in minimizing or eliminating the dusting tendencies of the finely divided solid substrate additives, thereby preventing the generation of toxic dusts.

There are many different kinds of additives well known in the art, which are improved by the use of the herein disclosed coatings. These additive substrates may include fillers, such as barium sulfate, clays, calcium carbonate, silicates, magnesium oxide, pigments, such as titanium dioxide, zinc oxide, lead chromate, cadmium sulfides, cadmium selenide, zinc sulfide, basic carbonate of white lead, stabilizers such as tribasic lead sulfate, basic lead chlorosilicate, dibutyl tin oxide and other salts of lead, zinc, cadmium, tin, and the like, flame retardants such as antimony oxide, ultra-violet absorbers, such as dibasic lead phosphite, slip agents, anti-block agents, vulcanizing materials, accelerators, and any other solid particle additives which have properties making them more or less difficultly wettable by the resin or plastic to which they are to be added.

The individual components of the coating are preferably melted together before their coating onto the additive substrate. The coating is then applied to the substrate by heating and/or blending operation. Any well-known blending or dispersing technique may be used. Following the completion of the coating step, the product may or may not be comminuted before its incorporation into the resin or plastic. Incorporation therein is done by the customary and well-known methods. Depending on the particular substrate additive and its function, the amounts to be incorporated into the particular resins are those which are in accord with the percentages known to the art taking into account the increased efficiency of the coated additive.

It is further contemplated as an additional feature of this invention to coat a water-containing substrate with the wax coating and simultaneously remove the water therefrom by carrying out the coating process at a temperature above that at which the water is removed.

The coated additives are advantageously used in such polymers as elastomers for example, natural and synthetic rubbers, chlorosulfonated polyethylene, ethylene-propylene copolymer rubbers, ethylene-propylene terpolymers, butyl, butadiene-styrene, silicone, acrylonitrile rubbers, and the like, and plastics, for example, polyvinyl chloride polymers and copolymers, polyethylene and copolymers, polypropylene, polyvinylidene chloride, polystryrene, polyimides, polyamides, polyacetals, acrylonitrile-butadiene-styrene, polycarbonates, chlorinated polyethylene polymethyl-methacrylate, polyaromatic sulfones, and the like.

A particular form of tribasic lead sulfate adapted for use according to the instant invention and that referred to in the examples is a dehydrated tribasic lead sulfate which may be made by heating a hydrous tribasic lead sulfate for about five hours at about 220–250° C. in an electric oven until a substantial portion of the water of hydration or combined water (80% or more) is eliminated. This dehydrated tribasic lead sulfate typically shows an X-ray diffraction pattern having characterizing "$d$" (interplaner) spacings in the vicinity of 3.45A°, 3.10A°, and 2.75A° and has an infra-red absorption peak wave length of about 9.4 microns.

The invention will be described in greater detail in terms of the examples presented herein below; however, it is in no way intended to limit the invention to the embodiments specifically shown therein. All parts and percentages given are by weight unless otherwise specified.

EXAMPLE 1

A study was made of the effect obtained by varying levels of fatty alcohol additive upon the melt viscosity of paraffin coated tribasic lead sulfate. Various ratios of paraffin wax (melting point 50° C.) and stearyl alcohol, were studied maintaining a combined coating level of 15% on the tribasic lead sulfate. The paraffin wax and stearyl alcohol were melted together by heating in an oven to 125° C. in the mixing chamber of a high speed blender (Waring Blendor). The tribasic lead sulfate was heated separately in an oven to 125° C. The coating was then applied by the gradual addition of the heated tribasic lead sulfate to the melted paraffin-wax composition, while maintaining vigorous agitation. The coated products were transferred to 8-ounce glass containers and melt viscosities determined at 125° C. using a Brookfield Viscosimeter, Model RVF at a shear rate of 20 r.p.m.

In the case of the composition containing no stearyl alcohol additive, that is 85% tribasic lead sulfate and 15% paraffin wax, the mix became extremely viscous after reaching a tribasic lead sulfate solids level of approximately 80%, and the mixing motor stalled due to the high viscosity. To prepare this composition, it was necessary to repeat the procedure using a more powerful, but slower speed mixer of the planetary type (Hobart Mixer, Model N–50).

The compositions of the coated products and their melted viscosities at 125° C. are tabulated below in Table I.

TABLE I

| Component | Composition, percent | | | | | | | | |
|---|---|---|---|---|---|---|---|---|---|
| Tribasic lead sulfate | 85 | 85 | 85 | 85 | 85 | 85 | 85 | 85 | 85 |
| Paraffin wax | 15 | 14.5 | 14 | 13 | 10 | 7.5 | 5 | 2.5 | 0 |
| Stearyl alcohol | | 0.5 | 1 | 2 | 5 | 7.5 | 10 | 12.5 | 15 |
| Melt viscosity, 125° C. (poises): | | | | | | | | | |
| Brookfield viscosity, 20 r.p.m. | 20,000 | 405 | 75 | 25 | 30 | 60 | 65 | 80 | 100 |

These data show the very beneficial effect of relatively low levels of stearyl alcohol upon melt viscosity of the coated tribasic lead sulfate.

EXAMPLE 2

A study was made to detremine the viscosity characteristics of tribasic lead sulfate after it was subjected to various paraffin wax-stearyl alcohol coatings. Data were obtained at relatively low temperatures, 75° C. and 100° C., and at two rates of shear, 4 r.p.m. and 20 r.p.m. In addition, data were obtained for three ratios of the wax-alcohol coating compositions in the absence of the tribasic lead sulfate. Results are tabulated below.

Data obtained by examining the coatings separately showed that the measured viscosities were low. The lowest viscosities of the tribasic lead sulfate were obtained with 1–2.5 parts stearyl alcohol.

Alcohols useful in the present invention include aliphatic primary alcohols ranging in carbon chain lengths of $C_8$, such as n-octyl and 2-ethylhexyl alcohols, to $C_{28}$, such as montanyl alcohol derived from montan wax. Unsaturated primary alcohols such as oleyl, and secondary alcohols such as ricinoleic acid and the methyl ester of 12-hydroxy stearic acid have also shown beneficial effects upon melt viscosity.

EXAMPLE 4

In order to show the various wax types which can be used and the pigment substrates coated, data are given below for a number of wax-stearyl alcohol coating applied to several substrates.

TABLE II

| Composition, parts by weight | | | Brookfield viscosity, poises | | | |
|---|---|---|---|---|---|---|
| | | | 75° C. | | 100° C. | |
| Tribasic lead sulfate | Paraffin | Stearyl alcohol | 4 r.p.m. | 20 r.p.m. | 4 r.p.m. | 20 r.p.m. |
| 0 | 10 | 5 | 0.1 | 0.1 | 0.1 | 0.1 |
| 0 | 7.5 | 7.5 | 0.1 | 0.2 | 0.1 | 0.1 |
| 0 | 5 | 10 | 0.2 | 0.2 | 0.2 | 0.1 |
| 85 | 14 | 1 | 310 | 78 | 200 | 64 |
| 85 | 12.5 | 2.5 | 450 | 154 | 200 | 60 |
| 85 | 10 | 5 | 700 | 290 | 300 | 88 |
| 85 | 7.5 | 7.5 | 1,000 | 430 | 350 | 100 |
| 85 | 5 | 10 | 730 | 440 | 700 | 380 |

EXAMPLE 3

To show the effect of different levels of coating and the effectiveness of alcohols of varying chain length and structure, the coating procedure using the high speed blender was extended to other variations using the same tribasic lead sulfate-paraffin wax base components. The compositions and melt viscosities at 125° C. are given below in Table III.

TABLE III

| Composition | | | Melt viscosity at 125° C. Brookfield at 20 r.p.m., poises |
|---|---|---|---|
| Percent tribasic lead sulfate | Percent paraffin wax | Additive | |
| 90 | 7.5 | 2.5% stearyl alcohol | 95 |
| 75 | 20 | 5% stearyl alcohol | 8 |
| 75 | 25 | | 270 |
| 80 | 13 | 7% n-octyl alcohol | 80 |
| 80 | 15 | 5% n-octyl alcohol | 75 |
| 80 | 15 | 5% 2-ethylhexyl alcohol | 100 |
| 85 | 14 | 1% n-lauryl alcohol | 85 |
| 85 | 10 | 5% n-lauryl alcohol | 40 |
| 85 | 7.5 | 7.5% n-lauryl alcohol | 90 |
| 85 | 12.5 | 2.5% montanyl alchol | 110 |
| 85 | 10 | 5% oleyl alcohol | 30 |
| 80 | 15 | 5% ricinoleic acid | 40 |
| 85 | 10 | 5% methyl 12-hydroxy stearylate | 70 |

These data show that with tribasic lead sulfate, a coating level as low as 10%, consisting of 7.5% paraffin wax and 2.5% stearyl alcohol, provides a melt viscosity about a third of that obtained with 25% paraffin coating without the alcohol additive.

TABLE IV

| Pigment substrate | Wax | Stearyl alcohol, percent | Viscosity at 125° C., poises |
|---|---|---|---|
| 85% Tribasic lead sulfate | 15% stearone | None | >20,000 |
| Do | 12.5% stearone | 2.5 | 120 |
| Do | 5% spermaceti | 5 | 95 |
| Do | 5% paraffin wax | 5 | 95 |
| Do | 15% ethylene-distearamide | None | >20,000 |
| | 7.5% ethylene-distearamide | 7.5 | 300 |
| Do | 20% castor wax | None | 140 |
| 80% Basic lead chlorosilicate.[1] | 20% ethylene-diricinoleamide | None | 200 |
| Do | 15% ethylene diricinoleamide | 5 | 95 |
| Do | 10% ethylene-distearamide | | |
| | 10% ethylene-diricinoleamide | None | >20,000 |
| Do | 7.5% ethylene-distearamide | 5 | 170 |
| | 7.5% ethylene-diricinoleamide | None | >20,000 |
| 85% basic lead chlorosilicate | 15% spermaceti | None | >20,000 |
| Do | 12.5% spermaceti | 2.5 | 110 |
| 80% Basic lead chlorosilicate. | 15% paraffin | 5 | 20 |
| 80% White lead [2] | do | 5 | 150 |
| 80% Medium chrome yellow.[3] | do | 5 | 50 |
| 80% Oncor 23A [4] | do | 5 | 15 |
| 50% Oncor 23A | 50% Chlorowax 70 [5] | None | >20,000 |
| Do | 40% Chlorowax 70 | 10 | 80 |
| 85% Titanox RA-50 [6] | 20% paraffin | 5 | 210 |
| 65% Titanox RA-50 | 35% paraffin | None | >20,000 |
| Do | 30% paraffin | 5 | 50 |
| 55% Titanox RA-50 | 45% paraffin | None | >20,000 |
| Do | 40% paraffin | 5 | 10 |
| 75% Titanox RA-50 | 25% Stearone | None | >20,000 |
| Do | 20% Stearone | 5 | 300 |

[1] Basic lead chlorosilicate=48% PbO, 3% Cl and 49% $SiO_2$, National Lead Co.
[2] White lead=basic lead carbonate, National Lead Co.
[3] Medium chrome yellow=Mineral Pigments Corp. No. 1238.
[4] Oncor 23A=Antimony silico oxide, National Lead Co.
[5] Chlorowax 70=70% chlorinated paraffin, Diamond Alkali Co.
[6] Titanox RA-50=Rutile titanium dioxide, National Lead Co.

EXAMPLE 5

To demonstrate utility of polyvinyl chloride stabilizers such as tribasic lead sulfate containing the special coating of this invention, the following tests were run. Two hundred grams of Geon 103 EP PVC resin (B. F. Goodrich Chemical Co.) and 1 gram of lead stearate were placed in the mixing chamber of a high speed mixer of the Waring type. The composition was mixed for 2.5 minutes and then 6 grams of coated tribasic lead sulfate, containing a coating of 7.5% paraffin wax and 7.5% stearyl alcohol, was added and mixing continued an additional 4 minutes. The dry blend batch temperature was about 75° C. at discharge after a total blending time of 6.5 minutes.

The process was repeated with the exception that 6 grams of uncoated tribasic lead sulfate was used in place of the coated product.

Portions of the two dry blends were placed side by side on a steel plate and covered with a second steel plate. Both plates had previously been preheated to 177° C. The plate assembly containing the dry blend samples was then positioned between steam heated platens of a plastic compression molding press and sheets molded in a 4 minute cycle at 177° C. The sheets were removed and allowed to cool. The composition containing the special coating was light cream in color, whereas the composition containing the uncoated tribasic lead sulfate was tan in color. The heat stabilizing efficiency advantage of the latter is readily apparent.

These data show that the coated tribasic lead sulfate will provide improved stability to commercial PVC dry blend compounds prepared in high speed mixers of the Henschel type. The coating on the stabilizer melts during the blending cycle due to frictional heat developed in the plastic compound during high speed mixing. Accordingly, the stabilizer is well dispersed and protects the resin during blending. Further, when the resulting dry blend compound is fed to an extruder or an injection molding press, the well dispersed stabilizer protects the PVC resin during the intial stages; whereas with the less well dispersed uncoated stabilizer, optimum protection is not provided until shear is developed at a later stage in the extruder screw when the uncoated stabilizer becomes more fully dispersed.

EXAMPLE 6

To demonstrate further the stability advantages of the coated stabilizers, and to show that similar effects cannot be achieved by separate addition of the coating components to the plastic compound, the following tests were made. Two vinyl plastic compositions were prepared consisting of 485 grams of Geon 103 EP resin, 15 grams of Acryloid K–120N acrylic processing aid and 5 grams of calcium stearate lubricant. To one compound was added 29.4 grams of tribasic lead sulfate containing a coating of 12.5% spermaceti wax and 2.5% stearyl alcohol. The other compound contained 25.0 grams of uncoated tribasic lead sulfate, 3.67 grams of spermaceti wax and 0.73 gram of stearyl alcohol.

The plastic components were hand blended in a 1 liter beaker and the compound processed on an oil heated two-roll plastic mill adjusted to provide a roll temperature of 196° C. The plastic blend was added to the rolls of the mill and fluxed and mill mixed for a 5-minute cycle. Each test compound was mill processed in an identical manner, the samples from the mill being in the form of 0.060" thick sheets.

The mill processed sheets were cut into 3" x 6" test specimens and comparative compression moldings made using the steam heated platens of a plastic molding press. One 3" x 6" plastic test specimen of each composition was placed side by side in a preheated (177° C.) 6" x 6" x 0.040" mold cavity and molded at 177° C. in a 10-minute cycle. The cycle consisted of preheating the specimens in the mold for 1 minute, application of 6000 p.s.i. pressure over a 1-minute period, maintaining the pressure for 3 minutes followed by cooling to 27° C. while under pressure in a 5-minute cooling cycle.

Examination of the molded sheet showed significant differences in color stability between the two compositions. The compound containing the coated tribasic lead sulfate was cream in color while the control compound which contained the uncoated tribasic lead sulfate and the separately added wax-alcohol additives was tan in color.

The comparative molding test was repeated with the exception that the heating period under pressure was extended to 15 minutes at 177° C. followed by 5 minutes cooling (total cycle 20 minutes). With the longer heat history, the heat stability advantage of the composition containing the coated stabilizer was again evident. It was buff in color, while the uncoated tribasic lead sulfate stabilized control had become a darker tan.

To show that in addition to the color differences there were differences in mechanical properties, sheets were prepared for impact resistance tests. Samples, 6" x 6" x 0.050" of each mill processed compound were compression molded in an electrically heated press at 196° C. in a 10-minute cycle which included 5 minutes of heating and 5 minutes cooling under pressure.

Impact resistance determinations were made using a Gardner Variable Height Impact Tester Model 1410, employing a plunger with an 0.5" diameter tip. The composition containing the coated tribasic lead sulfate had an impact resistance of 141 inch-pounds compared to 128 inch-pounds for the control compound containing the uncoated tribasic lead sulfate.

These test data clearly show the advantages of the coated stabilizer. It is evident that separate addition of the coating additives to the plastic compound does not provide equivalent performance.

EXAMPLE 7

To demonstrate the merits of the present invention in overcoming the dispersion and abrasion problems encountered with rutile type titanium dioxide pigments, the following tests were made. A rigid polyvinyl chloride composition consisting of 2000 grams of Geon 103 EP resin, 60 grams of organo-thio tin stabilizer, Thermolite 31 (Metal and Thermit Division, American Can Co.), 20 grams of calcium stearate lubricant, 53.4 grams of paraffin wax and 13.2 grams of stearyl alcohol, were placed in the mixing chamber of a laboratory Henschel Blender (Henschel-Prodex Blender, Model 2JSS). The chamber of the mixer was previously heated to 100° C. by circulating hot oil through the outer jacket. The dry blend was mixed at a motor speed of 3800 r.p.m. until the compound reached a temperature of 110° C. after 7 minutes. At this temperature 200 grams of rutile titanium dioxide, Titanox RA–40 was introduced and mixing continued. At one minute intervals the mixing was interrupted momentarily to withdraw small samples for later examination. Blending was continued for a total of 20 minutes after addition of the titanium dioxide pigment.

This process was then repeated with the exception that the paraffin wax and stearyl alcohol coating additive were omitted from the original charge to the blender, and after the stock temperature reached 110° C., 266.6 grams of coated titanium dioxide, consisting of 75% Titanox RA–50, 20% paraffin wax and 5% stearyl alcohol, were added. As in the previous test, periodic samples were withdrawn during the 20 minutes of Henschel blending after addition of the titanium dioxide.

To compare the plastic colors of the two test compounds, thin sheets were formed in a 4-minute compression molding cycle as described in Example 5 above. Portions of each test compound after equivalent times of blending were placed side by side in preparing these moldings, and color differences at the interface permitted critical color comparisons between the compounds. Visual examination of these moldings showed that after 4 minutes blending the test compound containing the uncoated titanium dioxide was very significantly grey compared to the compound containing the coated pigment given equivalent blending. As blending times increased the color differences became even more pronounced. To provide some quantitative data on the relative greying of the two compounds light reflectance values were obtained on the molded sheets with a Gardner Laboratory Hunter Multipurpose Reflectometer, using the blue filter. The results are given below:

TABLE V

| Minutes blending after TiO₂ addition | Percent reflectance—blue filter | |
|---|---|---|
| | Uncoated TiO₂ | Coated TiO₂ |
| 4 | 77.0 | 79.5 |
| 8 | 76.5 | 79.1 |
| 10 | 75.7 | 78.1 |
| 15 | 73.8 | 78.0 |
| 20 | 73.0 | 77.2 |

These data clearly demonstrate that the coating of the present invention will markedly reduce the abrasion of metal from processing equipment by titanium dioxide pigments, resulting in longer service life for the equipment and markedly reduced grey discoloration introduced into the plastic compound. Further, they show that similar performance cannot be achieved by the separate introduction of the coating components into the plastic compound.

EXAMPLE 8

To determine the effect differences in metal contamination would have upon heat stability, the compounds of Example 7 which had been blended 20 minutes after addition of the titanium dioxide, were subjected to high temperature and shear. A C. W. Brabender Corp. torque rheometer equipped with a No. 5 Roller Mixing Chamber was used for these studies. Test conditions were a temperature of 200° C. and a shear rate of 33 r.p.m. Color changes were followed by removing small samples at 5-minute intervals. Rheological changes in the polymer, more particularly cross-linking, are evident from the mixing torque data up to the time of massive polymer degradation.

Results are tabulated below. Use of the titanium dioxide containing the special coating, since it reduced metal contamination introduced during blending, provided a substantial improvement in the thermal stability of the plastic compound.

TABLE VI

| Titanium dioxide in compound | Uncoated, min. | Coated, min. |
|---|---|---|
| Mixing torque—meter-grams: | | |
| 5 | 1,900 | 1,940 |
| 10 | 2,240 | 2,260 |
| 15 | 2,140 | 2,150 |
| 20 | 2,140 | 2,140 |
| 25 | 2,050 | 2,050 |
| 30 | 1,925 | 1,925 |
| 35 | 1,950 | 1,850 |
| 40 | 2,675 | 1,950 |
| 45 | 4,250 | 2,600 |
| 50 | | 3,450 |
| Start of cross-link | 37.5 | 42.0 |
| Color changes: | | |
| Little change | 5-30 | 5-35 |
| Light grey | 35 | 40 |
| Dark grey | 40 | 45 |

EXAMPLE 9

A comparison was made of the performance of coated and uncoated rutile titanium dioxide in chlorosulfonated polyethylene rubber, Hypalon 40 (The Du Pont Company). Five hundred grams of Hypalon 40 were banded on a two roll mill heated to 149° C. The stock was mill mixed for 5 minutes and then 13.33 grams of coated Titanox RA-50, containing 20% paraffin and 5% stearyl alcohol, was added to the rolling bank of rubber. Milling was continued for 6 minutes, removing samples at one minute intervals after addition of the coated titanium dioxide.

The process was repeated with the exception that after 3 minutes of milling of the Hypalon 40, 2.665 grams of paraffin wax and 0.665 gram of stearyl alcohol were added. After 2 minutes of milling and blending, 10 grams of uncoated Titanox RA-50 were added. Milling was continued for 6 minutes, sampling again at 1-minute intervals.

The test specimens from the two compounds were then molded side by side into smooth 0.040″ thick sheets at a temperature of 149° C. using a cycle of 5 minutes heating and 5 cooling under pressure. Reflectance values were obtained on the molded sheets using a Hunter Multipurpose Reflectometer with the blue filter.

Test results given in Table VII below confirm what was observed during the mill processing. The coating titanium dioxide provides greater tint development in the early stages of processing, and maintains color better with more prolonged milling.

TABLE VII

| Minutes after TiO₂ addition | Percent reflectance, blue filter | | | | | |
|---|---|---|---|---|---|---|
| | 1 | 2 | 3 | 4 | 5 | 6 |
| Uncoated TiO₂ | 75.8 | 75.0 | 72.8 | 71.4 | 71.2 | 68.5 |
| Coated TiO₂ | 75.5 | 78.5 | 76.5 | 76.0 | 74.8 | 73.6 |

EXAMPLE 10

A study was made of uncoated and coated antimony silico oxide flame retardant additive, Oncor 23A, in a high density polyethylene resin modified with a 70% chlorinated paraffin. Three hundred and eight grams of Marlex 6009 (Phillips Petroleum Company) high density polyethylene, 40 grams of Chlorowax 70 chlorinated paraffin, 4 grams of zinc stearate and 2 grams of calcium stearate were hand blended and the mix fluxed and blended on a two roll mill heated to 143° C. Mixing was continued for 8 minutes and then 50.0 grams of coated Oncor 23A, containing 15% paraffin and 5% stearyl alcohol, were added. Milling was continued for 20 minutes, removing specimens at 2.5 minute intervals for 15 minutes and then after the final 5 minutes.

The process was repeated with the exception that 7.5 grams of paraffin and 2.5 grams stearyl alcohol were included in the original blend, and 40 grams of uncoated Oncor 23A were added after 8 minutes of milling.

The greater ease of wetting and dispersions of the coated Oncor 23A was readily apparent at the early stages of mill blending. It appeared to be uniformly dispersed after about 1 minute, while the uncoated product required about 2.5 minutes to become uniformly dispersed. There was no discernible discoloration from thermal degradation or metal contamination in either compound during the 28 minutes of mill processing.

The test specimens removed at 2.5 minute intervals after addition of the Oncor 23A were then subjected to mold stability studies at 163° C. and 177° C. Samples of each compound after equal mill processing were molded side by side in an 0.020″ cavity mold using a 9-minute cycle consisting of 4 minutes heating and 5 minutes cooling under pressure.

The molded specimens increased in discoloration from cream to buff to tan with increasing times of mill processing. After equivalent heat exposure, the compound containing the coated Oncor 23A exhibited significantly less discoloration than the compound containing the uncoated pigment. This is readily apparent in the Hunter Reflectometer data given below in Table VIII.

TABLE VIII

| Mill processing after TiO₂ addition | Percent reflectance, blue filter | | | | | | |
|---|---|---|---|---|---|---|---|
| | 2.5 | 5.0 | 7.5 | 10.0 | 12.5 | 15.0 | 20.0 |
| Molded at 163° C.: | | | | | | | |
| Uncoated Oncor 23A, min. | 60.2 | 61.5 | 58.6 | 55.6 | 49.2 | 51.5 | 51.2 |
| Coated Oncor 23A, min. | 60.3 | 60.8 | 59.6 | 60.3 | 55.2 | 56.8 | 56.0 |
| Molded at 177° C.: | | | | | | | |
| Uncoated Oncor 23A, min. | 53.0 | 49.8 | 48.6 | 42.7 | | | |
| Coated Oncor 23A, min. | 56.3 | 57.6 | 56.5 | 49.6 | | | |

What is claimed is:

1. A coated particulate inorganic solid additive comprising a solid inorganic substrate having coated thereon a coating comprising a wax which is solid at ambient temperature and at least 5% of a hydroxyl containing fatty material having from 8 to 28 carbon atoms based on the total composition of the coating, said coated additive characterized by a Brookfield melt viscosity at 20 r.p.m. and 125° C. of less than 20,000 poises.

2. The coated solid additive of claim 1 in which the wax component of said coating consists of paraffin wax.

3. A coated particulate inorganic solid additive comprising a solid inorganic substrate having coated thereon from 10 to 50% based on the total composition of the additive of a mixture of a wax which is solid at ambient temperature having a melting point between 50° and 150° C. and from 5% to 50% of a fatty alcohol having from 8 to 28 carbon atoms based on the total composition of the coating, said coated additive characterized by a Brookfield melt viscosity at 20 r.p.m. and 125° C. of less than 20,000 poises.

4. The coated solid additive of claim 3 in which the wax is paraffin wax.

5. The coated solid additive of claim 3 in which the wax is spermaceti.

6. The coated solid additive of claim 3 in which the wax is ethylene distearamide.

7. The coated solid additive of claim 3 in which the wax is paraffin wax and the fatty alcohol is stearyl alcohol.

8. The coated solid additive of claim 3 in which the wax is paraffin wax and the fatty alcohol is lauryl alcohol.

9. The coated solid additive of claim 3 in which the solid additive substrate is dehydrated tribasic lead sulfate.

10. The coated solid additive of claim 3 in which the solid additive substrate is titanium dioxide.

11. The coated solid additive of claim 3 in which the solid additive substrate is an antimony oxide pigment.

12. The coated solid additive of claim 11 in which one component of the coating is an halogenated wax.

13. The process for coating particulate inorganic solid additives especially adapted for use in thermoplastic polymers, which comprises coating a solid inorganic substrate with from 10 to 50% based on the total composition of the additive, a mixture of a hydrocarbon wax having a melting point between 50° and 150° C. and from 5 to 50% of a hydroxyl containing fatty material having from 8 to 28 carbon atoms based on the total composition of the coating.

14. The process of claim 13 in which the solid substrate is dehydrated tribasic lead sulfate.

15. The process of claim 13 in which the solid substrate is titanium dioxide.

16. The process of claim 13 in which the wax is paraffin wax.

17. The process of claim 13 in which the wax is spermaceti.

18. A composition of a thermoplastic polymer having incorporated therein a coated particulate inorganic solid additive, having a coating thereon comprising a hydrocarbon wax which is solid at ambient temperature and at least 5% of a hydroxyl containing fatty material having from 8 to 28 carbon atoms based on the total composition of the coating.

19. The composition of claim 18 in which the polymer is a vinyl chloride polymer.

20. The composition of claim 19 in which the solid additive is dehydrated tribasic lead sulfate.

21. The composition of claim 19 in which the wax is paraffin wax.

22. The composition of claim 19 in which the wax is spermaceti.

23. A coated particulate solid inorganic additive for incorporation into thermoplastic polymers comprising a solid inorganic substrate having coated thereon a coating of wax which is solid at ambient temperature and from 5% to 50% of a hydroxyl containing fatty material having from 8 to 28 carbon atoms based on the total composition of the coating.

References Cited
UNITED STATES PATENTS

| | | | |
|---|---|---|---|
| 1,651,733 | 12/1927 | Sheppard et al. | 106—308 |
| 2,108,768 | 2/1938 | Helft | 134—79 |
| 3,072,586 | 1/1963 | Pitrot | 260—28.5 |
| 2,009,436 | 7/1935 | Coolidge et al. | 134—58 |
| 2,274,521 | 2/1942 | Berry. | |
| 2,344,671 | 3/1944 | Bertsch. | |

MORRIS LIEBMAN, Primary Examiner

S. L. FOX, Assistant Examiner

U.S. Cl. X.R.

106—308